US012567591B2

(12) United States Patent　　　　(10) Patent No.:　US 12,567,591 B2
Bock et al.　　　　　　　　　　　　(45) Date of Patent:　　　Mar. 3, 2026

(54) GAS DIFFUSION LAYER FOR FUEL CELLS, HAVING IMPROVED BENDING PROPERTIES

(71) Applicant: CARL FREUDENBERG KG, Weinheim (DE)

(72) Inventors: Achim Bock, Weinheim (DE); Kristof Klein, Weinheim (DE); Christoph Rakousky, Ober-Ramstadt (DE); Hannes Barsch, Heidelberg (DE)

(73) Assignee: CARL FREUDENBERG KG, Weinheim (DE)

( * ) Notice: Subject to any disclaimer, the term of this patent is extended or adjusted under 35 U.S.C. 154(b) by 497 days.

(21) Appl. No.: 18/042,024

(22) PCT Filed: Aug. 4, 2021

(86) PCT No.: PCT/EP2021/071726
§ 371 (c)(1),
(2) Date: Feb. 17, 2023

(87) PCT Pub. No.: WO2022/037939
PCT Pub. Date: Feb. 24, 2022

(65) Prior Publication Data
US 2024/0014406 A1　　Jan. 11, 2024

(30) Foreign Application Priority Data
Aug. 20, 2020　(DE) ..................... 10 2020 121 892.3

(51) Int. Cl.
*H01M 4/86*　　　(2006.01)
*H01M 4/88*　　　(2006.01)
(52) U.S. Cl.
CPC ....... *H01M 4/8668* (2013.01); *H01M 4/8605* (2013.01); *H01M 4/8657* (2013.01);
(Continued)

(58) Field of Classification Search
CPC ............ H01M 4/8605; H01M 4/8657; H01M 4/8668; H01M 4/8673; H01M 4/8807; H01M 4/8846; H01M 4/8885
See application file for complete search history.

(56) References Cited

U.S. PATENT DOCUMENTS 5,998,057 A　12/1999　Koschany et al.
6,451,470 B1　9/2002　Koschany et al.
(Continued)

FOREIGN PATENT DOCUMENTS

DE　　19709199 A1　9/1998
EP　　　1237214 A2　9/2002
(Continued)

OTHER PUBLICATIONS

English translation of WO Publication 2015-146223, Oct. 2015.*

*Primary Examiner* — Brittany L Raymond
(74) *Attorney, Agent, or Firm* — LEYDIG, VOIT & MAYER, LTD.

(57)　　　　ABSTRACT

A gas diffusion layer for a fuel cell, including a flat electrically conductive material and/or a sintered product of the flat electrically conductive material. The flat electrically conductive material includes at least one fiber material selected from the group consisting of carbon fiber nonwoven fabrics, carbon fiber woven fabrics, and a combination thereof. The at least one fiber material includes at least one fluorine-containing polymer and at least one polymer different from the at least one fluorine-containing polymer selected from the group consisting of polyaryletherketones, polyphenylene sulfides, polysulfones, polyethersulfones, partially aromatic (co)polyamides, polyimides, polyamide-imides, polyetherimides and combinations thereof. The at least one fluorine-containing polymer and the at least one polymer different
(Continued)

from the at least one fluorine-containing polymer are applied to the at least one fiber material and/or incorporated therein.

20 Claims, 4 Drawing Sheets

(52) U.S. Cl.
CPC ....... *H01M 4/8673* (2013.01); *H01M 4/8807* (2013.01); *H01M 4/8846* (2013.01); *H01M 4/8885* (2013.01)

(56) References Cited

U.S. PATENT DOCUMENTS

| | | | |
|---|---|---|---|
| 2006/0078784 A1 | 4/2006 | Liu et al. | |
| 2008/0187807 A1 | 8/2008 | Schmidt et al. | |
| 2012/0148936 A1 | 6/2012 | Uensal et al. | |
| 2013/0101906 A1* | 4/2013 | Alvarez Gallego | ........................ H01M 4/8857 429/480 |
| 2014/0127606 A1* | 5/2014 | Kuwata | ............... H01M 8/0245 429/534 |

FOREIGN PATENT DOCUMENTS

| | | | |
|---|---|---|---|
| EP | 2722917 A1 | 4/2014 | |
| JP | 2013536541 A | 9/2013 | |
| KR | 20100089333 A | 8/2010 | |
| WO | WO 97/20358 A1 | 6/1997 | |
| WO | WO 2006/117199 A1 | 11/2006 | |
| WO | WO 2011/020843 A1 | 2/2011 | |
| WO | WO 2013/144631 A1 | 10/2013 | |
| WO | WO 2015/118323 A1 | 8/2015 | |
| WO | WO 2015-146223 | * 10/2015 | |

* cited by examiner

GAS DIFFUSION LAYER FOR FUEL CELLS, HAVING IMPROVED BENDING PROPERTIES

CROSS-REFERENCE TO PRIOR APPLICATION

This application is a U.S. National Phase application under 35 U.S.C. § 371 of International Application No. PCT/EP2021/071726, filed on Aug. 4, 2021, and claims benefit to German Patent Application No. DE 10 2020 121 892.3, filed on Aug. 20, 2020. The International Application was published in German on Feb. 24, 2022 as WO 2022/037939 A1 under PCT Article 21(2).

FIELD

The present invention relates to a gas diffusion layer having high bending stiffness and high flexibility, a method for producing such a gas diffusion layer, and a fuel cell comprising such a gas diffusion layer.

BACKGROUND

Fuel cells use the chemical reaction of a fuel, in particular hydrogen, with oxygen to form water to generate electrical energy. In hydrogen-oxygen fuel cells, hydrogen or a hydrogen-containing gas mixture is fed to the anode, where an electrochemical oxidation occurs with the release of electrons ($H_2 \rightarrow 2 H^+ + 2 e^-$). The protons are transported from the anode compartment into the cathode compartment through a membrane, which separates the reaction compartments in a gas-tight manner and electrically insulates them. The electrons provided at the anode are conducted to the cathode via an external conductive circuit. Oxygen or an oxygen-containing gas mixture is fed to the cathode, whereby a reduction of the oxygen takes place with the absorption of the electrons. The oxygen anions thus formed react with protons transported through the membrane, thus forming water ($\frac{1}{2} O_2 + 2 H^+ + 2 e^- \rightarrow H_2O$).

For many applications, especially in the automotive drive train, low-temperature proton exchange membrane fuel cells (PEMFC, also called polymer electrolyte membrane fuel cells) are used, the heart of which is a polymer electrolyte membrane (PEM) which is permeable only to protons (or oxonium ions $H_3O^+$) and water, and which spatially separates the oxidation agent, generally the air's oxygen, from the reduction agent. A catalyst layer is applied to the gas-tight, electrically-insulating, proton-conducting membrane on the anode and cathode sides, forming the electrodes and usually containing platinum as the catalytically active metal. The actual redox reactions and charge separations occur in the catalyst layers. The membrane and the catalyst layers form a unit, also referred to as a CCM (catalyst coated membrane). A gas diffusion layer (GDL) is provided on both sides of the CCM, which stabilizes the cell structure and performs transport and distribution functions for the reaction gases, water, heat, and current. The membrane, electrodes and gas diffusion layer form the membrane-electrode assembly (MEA). Flow distribution plates (so-called bipolar plates) are arranged between the membrane electrode assemblies, which have channels for feeding the adjacent cathode and anode with process gases and, usually, additional internal cooling channels.

The gas diffusion layers located between the flow distribution plates and the catalyst layers are of essential importance for the function and performance of the fuel cell. All process components consumed and produced in the electrode reactions must be transported through the gas diffusion layer and homogeneously distributed by the macroscopic structure of the flow distribution plates/bipolar plates to the microscopic structure of the catalyst layers. The electrons produced and consumed in the half-cell reactions must be conducted to the flow distribution plates with the lowest possible voltage loss. The heat produced during the reaction must be dissipated by the coolant within the flow distribution plates, which is why the materials of the GDL also have to have sufficient thermal conductivity. Moreover, the GDL must also act as a mechanical compensation between the macro-structured flow distribution plate and the catalyst layers. In addition, the component tolerances must be compensated and the compressive pressure must be distributed. The GDL also has the function of mechanically protecting the extremely thin membranes exposed to high loads in the fuel cells. Consequently, high demands are placed on the mechanical properties of the GDL in particular.

Gas diffusion layers for fuel cells are usually made of a carbon fiber substrate, which is usually hydrophobically finished with fluorine-polymers (e. g. PTFE) and then coated with a microporous layer (MPL) over their entire surface. The MPL is usually made of a fluorine-containing polymer as a binder (e. g. PTFE) and a porous and electrically conductive carbon material (e. g. carbon black or graphite powder). The three following materials are currently used as the carbon substrates for the GDL:

Carbon fiber papers (wet laid and chemically bonded carbon fiber nonwoven fabrics, with chemical binders that are carbonized), Carbon fiber fabric (e.g., made from yarns of oxidized but not yet carbonized polyacrylonitrile fibers that are carbonized or graphitized after weaving), Carbon fiber nonwoven fabrics (e.g., dry-laid, carded and water-jet consolidated nonwoven fabrics of oxidized polyacrylonitrile that are subsequently thickness calibrated and carbonized).

Carbon fiber papers have the technical advantage of high strength against different types of loads (tension, bending, shear). This provides good force transfer from the webs of the flow distribution plates/bipolar plates into the channel areas, which ensures homogeneous surface pressure and connection of the electrodes through the GDL. However, these advantages are always associated with strong material embrittlement, which is shown by the papers rupturing even at low bending stress. The causes of this behavior are the product design and the manufacturing process. In particular, the chemical binders (usually phenolic resins) used to manufacture carbon fiber papers become very brittle during carbonization and are responsible for the material behavior described.

In the field of strength theory, a distinction is made between different types of loading depending on the forces acting on a component. There is a need for materials for gas diffusion layers which, with otherwise equivalent mechanical properties, behave advantageously in the case of geometric changes such as those that occur in the case of bending loads (e.g. bending, curvature). The materials used to date do not yet exhibit an optimum combination of properties. For example, these materials are either flexurally stiff and brittle (papers) or they are flexurally soft and flexible (nonwoven fabrics, fabrics). A combination of high bending stiffness and high flexibility would be desirable.

WO 2015/118323 (DE 112015000657 T5) describes a porous gas diffusion substrate comprising the following components:

(a) a porous nonwoven fabric comprising carbon fibers, (b) a carbonaceous residue embedded in the porous nonwoven fabric, (c) a fluorinated polymer; and (d) inert particles, wherein at least some of the carbon fibers of the porous nonwoven fabric have a coating comprising the fluorinated polymer and the inert particles.

The preparation of the porous gas diffusion substrate comprises the following steps:

(i) Providing a porous nonwoven fabric comprising carbon fibers;

(ii) providing a dispersion comprising a carbonizable resin;

(iii) impregnating the porous nonwoven fabric with the dispersion of step (ii);

(iv) curing the carbonizable resin at a temperature of 100° C. to 300° C.;

(v) Heat treating to carbonize/graphitize the carbonizable resin at a temperature of 900° C. to 3000° C. to provide a gas diffusion substrate precursor;

(vi) Providing a dispersion comprising water, fluorinated polymer and inert particles;

(vii) treating the gas diffusion substrate precursor with the dispersion prepared in step (vi);

(viii) drying; and (ix) heating to a temperature of up to 400° C. to provide the gas diffusion substrate.

Impregnation of the porous nonwoven fabric with a carbonizable resin and subsequent carbonization lead to embrittlement of the material, so that the resulting gas diffusion substrates have high bending stiffness but poor flexibility.

WO 97/20358 relates to a gas diffusion electrode for polymer electrolyte membrane fuel cells comprising a gas diffusion layer containing a mechanically stable support material, which may be a nonwoven fabric, woven fabric or paper containing carbon fibers, glass fibers or fibers of organic polymers. To produce the gas diffusion electrode, a suspension is applied to the support material or the latter is impregnated with a suspension containing an electrically conductive material, e.g. carbon black, and a binder material. Suitable binder materials include temperature-stable polymers such as perfluorinated polymers, polyetherketones, polyethersulfones, polysulfones, polybenzimidazoles, polyphenylene sulfide, polyimides, polyamides and polyphenylene oxides. As mentioned, depending on the desired hydrophobicity, several binders can be mixed. This document does not teach the use of a combination of special fluorine-containing polymers and special high-performance polymers to optimize the mechanical properties, especially under a bending load.

SUMMARY

In an embodiment, the present disclosure provides a gas diffusion layer for a fuel cell, comprising a flat electrically conductive material and/or a sintered product of the flat electrically conductive material. The flat electrically conductive material includes at least one fiber material selected from the group consisting of carbon fiber nonwoven fabrics, carbon fiber woven fabrics, and a combination thereof. The at least one fiber material includes at least one fluorine-containing polymer and at least one polymer different from the at least one fluorine-containing polymer selected from the group consisting of polyaryletherketones, polyphenylene sulfides, polysulfones, polyethersulfones, partially aromatic (co)polyamides, polyimides, polyamide-imides, polyetherimides and combinations thereof. The at least one fluorine-containing polymer and the at least one polymer different from the at least one fluorine-containing polymer are applied to the at least one fiber material and/or incorporated therein.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
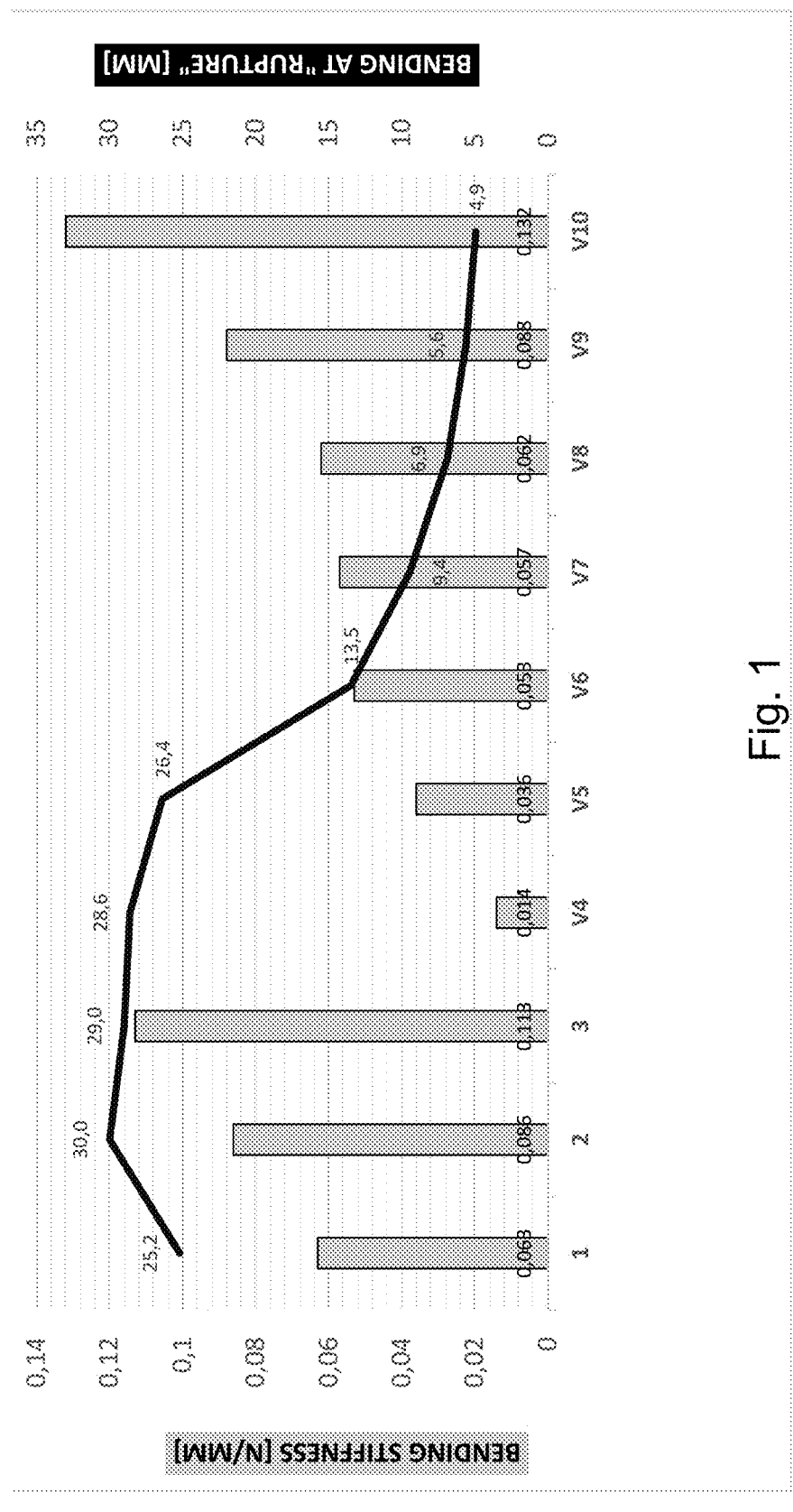
FIG. 1 shows the bending stiffness and the maximum bending up to rupture or until the specimens slide off the support points for each of three GDLs according to an embodiment of the invention and for each of 7 comparative GDLs.

In an embodiment, the present invention provides a flat electrically conductive material and a gas diffusion layer based thereon for a fuel cell, while avoiding the disadvantages mentioned above.

Surprisingly, it has now been established that the foregoing disadvantages are solved and a flexibly stiffened composite material is obtained that is particularly well suited to gas diffusion layers when a carbon fiber substrate in the form of a nonwoven or woven fabric is finished with a hydrophobic fluoropolymer and with certain high-performance thermoplastics.

An embodiment of the invention comprises a gas diffusion layer for a fuel cell, comprising:

A) a flat, electrically conductive material, comprising a) at least one fiber material selected from carbon fiber nonwoven fabrics, carbon fiber woven fabrics, and mixtures thereof, wherein the fiber material includes b1) at least one fluorine-containing polymer, and b2) at least one polymer different from b1) selected from polyaryletherketones, polyphenylene sulfides, polysulfones, polyethersulfones, partially aromatic (co)polyamides, polyimides, polyamide-imides, polyetherimides and mixtures thereof, coated thereon and/or incorporated therein, and/or comprising a sintered product of A)

and

B) optionally a microporous layer on one of the surfaces of the electrically conductive material A).

An embodiment discloses a gas diffusion layer, wherein the flat electrically conductive material A) is obtainable by coating and/or impregnating at least one fiber material a), selected from carbon fiber nonwoven fabrics, carbon fiber woven fabrics and mixtures thereof, comprising an aqueous composition comprising at least one fluorine-containing polymer b1), and at least one polymer b2) different from b1), selected from polyaryletherketones, polyphenylene sulfides, polysulfones, polyethersulfones, partially aromatic (co)polyamides, polyimides, polyamide-imides, polyether-imides and mixtures thereof, and subsequent drying and/or sintering of the treated fiber material.

An embodiment of the invention discloses a method for producing a gas diffusion layer for a fuel cell, comprising a flat electrically conductive material A) comprising the steps of:

i) providing at least one fiber material selected from carbon fiber nonwoven fabrics, carbon fiber woven fabrics, and mixtures thereof, ii) coating and/or impregnating the fiber material provided in step i) with a composition comprising at least one fluorine-containing polymer b1) and at least one polymer b2) different from b1) and selected from polyetherketones, polyphenylene sulfides, polysulfones, polyethersulfones, partially aromatic (co)polyamides, polyimides, polyamide-imides, polyether-imides and mixtures thereof, iii) subjecting the coated and/or impregnated fiber material to drying and/or sintering, and iv) optionally coating the dried and/or sintered fiber material with a microporous layer.

In an embodiment, a fuel cell is disclosed comprising at least one gas diffusion layer as defined above and in the following, or obtainable by a method as previously and hereinafter defined.

An embodiment of the invention discloses the use of a flat electrically conductive material A), comprising a) at least one fiber material selected from carbon fiber nonwoven fabrics, carbon fiber woven fabrics and mixtures thereof, wherein the fiber material includes b1) at least one fluorine-containing polymer, and b2) at least one polymer different from b1) selected from polyetherketones, polyphenylene sulfides, polysulfones, polyethersulfones, partially aromatic (co)polyamides, polyimides, polyamide-imides, polyether-imides and mixtures thereof, applied thereto and/or incorporated therein, and/or a sintered product of A), as a or in a gas diffusion layer for a fuel cell.

The flat electrically conductive materials used in accordance with embodiments of the invention and the gas diffusion layers based thereon have the following advantages:

they combine good product properties in terms of application technology with good processability, compared with the stiffened carbon fiber papers preferably used in the past, they exhibit improved flexural behavior with otherwise comparable mechanical properties, for the first time, a property combination of bending stiffness and flexibility is achieved, in the 3-point bending flexural test in particular, a significantly greater maximum bending (either until rupture occurs or until the specimen slips off the support points) or a significantly greater bending angle can be achieved with comparable bending stiffnesses or flexural moduli.

Bending Tests

The determination of the bending properties can be carried out using standard methods known to the person skilled in the art, such as those described in DIN EN ISO 178: 2019-08 (Plastics—Determination of bending properties). The principle of the bending flexural test is based on a bending apparatus in which a specimen is positioned as a freely supported beam on two supports and is loaded at midspan via an indent (3-point bending flexural test). The test is performed by measuring the bending at midspan at constant speed up to a specified deformation or until failure of the specimen (=maximum bending until rupture or slippage of the specimens from the supports).

The bending flexural test results can be used firstly to determine the bending stiffness [N/mm] as the slope of the initial straight-line section of the flexural stress-strain curve. This can be read from the load/displacement diagram, i.e. in accordance with the formula given below: $(X_H - X_L)/D_L$. The bending stiffness is a measure of the resistance to a deformation of a component subjected to bending stress.

Furthermore, the flexural modulus E [N/mm² oder MPa] can be determined. The flexural modulus is calculated as follows:

$$E = (I_v^3(X_H - X_L))/(4D_L ba^3)$$

with
E: flexural modulus in kN/mm²
$I_v$: support span in mm
$X_H$: End of flexural modulus determination in kN
$X_L$: Beginning of flexural modulus determination in kN
$D_L$: Bending in mm between $X_H$ and $X_L$
b: Specimen width in mm
a: Specimen thickness in mm The maximum bending angle $\alpha$ can also be calculated from the maximum bending and half the support span:

$$\alpha = \arctan(\text{max. bending/half support span})$$

Preferably, the flat electrically conductive material A) or a sintered product thereof has a bending stiffness, determined by loading at midspan in a 3-point bending flexural test according to DIN EN ISO 178:2019-08 on a 50 mm wide, 0.13 mm thick and 100 mm long rectangular test specimen at a support span of 32 mm and a test speed of 2 mm/min, from 0.05 to 0.08 N/mm.

Preferably, the flat electrically conductive material A) or a sintered product thereof has a maximum bending angle $\alpha$, determined by loading at midspan in a 3-point bending flexural test according to DIN EN ISO 178:2019-08 on a 50 mm wide, 0.13 mm thick and 100 mm long rectangular test specimen at a support span of 32 mm and a test speed of 2 mm/min, from 50 to 60°.

Preferably, the flat electrically conductive material A) or a sintered product thereof has a flexural modulus, determined by loading at midspan in a 3-point bending flexural test according to DIN EN ISO 178:2019-08 on a 50 mm wide, 0.13 mm thick and 100 mm long rectangular test specimen at a support span of 32 mm and a test speed of 2 mm/min, from 3000 to 6000 N/mm².

Preferably, a gas diffusion layer according to an embodiment of the invention comprising a flat electrically conductive material and a microporous layer has a bending stiffness, determined by loading at midspan in a 3-point bending flexural test according to DIN EN ISO 178:2019-08 on a 50 mm wide, 0.16 mm thick and 100 mm long rectangular test specimen at a support span of 32 mm and a test speed of 2 mm/min, from 0.08 to 0.12 N/mm.

Preferably, a gas diffusion layer according to an embodiment of the invention comprising a flat electrically conductive material and a microporous layer has a maximum bending angle α determined by loading at midspan in a 3-point bending flexural test according to DIN EN ISO 178:2019-08 on a 50 mm wide, 0.16 mm thick and 100 mm long rectangular test specimen at a support span of 32 mm and a test speed of 2 mm/min, from 50 to 60°.

Preferably, a gas diffusion layer according to an embodiment of the invention comprising a flat electrically conductive material and a microporous layer has a flexural modulus, determined by loading at midspan in a 3-point bending flexural test according to DIN EN ISO 178:2019-08 on a 50 mm wide, 0.16 mm thick and 100 mm long rectangular test specimen at a support span of 32 mm and a test speed of 2 mm/min, from 3000 to 6000 N/mm².

Gas Diffusion Layer

The flat electrically conductive material and the gas diffusion layer used in accordance with embodiments of the present invention is a flat sheet-like object having an essentially two-dimensional, planar extension and a small thickness relative thereto. The gas diffusion layer according to an embodiment of the invention has a base area usually essentially corresponding to the base area of the adjacent membrane comprising the catalyst layers and to the base area of the adjacent flow distribution plate of the fuel cell. The shape of the base area of the gas diffusion layer can be, for example, polygonal (n-sided, with n≥3, e. g. triangular, rectangular, pentagonal, hexagonal, etc.), circular, circular segment-shaped (e. g., semicircular), ellipsoid or elliptical segment-shaped. Preferably, the base area is rectangular or circular.

The gas diffusion layer comprises, as component A), a fiber-reinforced composite of at least one electrically conductive flat carbon fiber material a), at least one fluorine-containing polymer b1) and at least one polymer b2) different from polymer b1), selected from polyetherketones, polyphenylene sulfides, polysulfones, polyethersulfones, partially aromatic (co)polyamides, polyimides, polyamide-imides, polyether-imides and mixtures thereof. As will be described in more detail below, component b1) may serve to increase the hydrophobicity of fiber material a). Component b2) may serve to stiffen the flat electrically conductive material, or the gas diffusion layer. The combination of components a), b1) and b2) achieves the advantageous mechanical properties described above and, in particular, advantageous flexural behavior. For this purpose, the at least one fiber material a) can be finished with the polymer components b1) and b2) and with further additives, if required, by means of conventional application and impregnation processes. Such processes are described in more detail below.

The at least one fiber material a) is selected from carbon fiber nonwoven fabrics, carbon fiber woven fabrics, and mixtures thereof including polymer components b1) and b2) applied thereto and/or incorporated therein. Preferably, the fiber material a) comprises at least one carbon fiber nonwoven fabric. In a particular embodiment, the fiber material a) consists of a carbon fiber nonwoven fabric.

The fibers contained in the fiber material a) comprise carbon fibers and optionally fibers different therefrom, preferably selected from glass fibers, fibers of organic polymers, such as polypropylene, polyester, polyphenylene sulfide, polyetherketones, and mixtures thereof. Specifically, the fibers contained in the fiber material a) consist only of carbon fibers.

The production of the carbon fibers can be performed in the usual manner, wherein polyacrylonitrile fibers (PAN fibers) are preferably utilized as the starting material. PAN fibers are made by radical polymerization of a monomer composition preferably including at least 90 wt % acrylonitrile in relation to the overall weight of the monomers used for polymerization. The polymer solution thus obtained is spun to filaments and combined in ropes by, for example, wet spinning and coagulation. Before this PAN precursor is transformed to carbon fibers under high temperatures, it is usually subjected to oxidative cyclizing (also referred to as oxidation, in short) in an oxygen-containing atmosphere at elevated temperatures of about 180 to 300° C. The resulting chemical cross-linking improves the dimensional stability of the fibers. Subsequently, at temperatures of at least 1200° C., the actual pyrolysis to carbon fibers is performed. Depending on the shape of the desired fiber material, either the initial fibers or an already flat fiber material can be used for this pyrolysis. Depending on the temperature of the pyrolysis, a distinction is made between carbonizing and graphitizing. Carbonizing is a treatment at about 1200 to 1500° C. under an inert gas atmosphere leading to volatile products being released. Graphitizing, i. e., heating to about 2000 to 3000° C. under an inert gas achieves so-called high-modulus or graphite fibers. These fibers have high purity, light weight, high strength and excellent conductivity of electricity and heat.

With carbon fiber fabrics, the flat fiber material is produced by crossing two thread systems, warp (warp threads) and weft (weft threads). As in textiles, fiber bundles are flexibly but inseparably joined. For the production of carbon fiber fabrics, preferably oxidized, but not yet carbonized or graphitized PAN fibers are used. Carbonizing or graphitizing is performed after weaving to provide the flat fiber material with electrical conductivity.

To produce carbon fiber nonwoven fabrics non-oxidized or oxidized PAN fibers may be used. In a first preferred embodiment, in a first step, the fibers are laid (carded) in a dry state to form a sliver and subsequently consolidated to form a nonwoven fabric. This can be done, for example, by hydro-entangling wherein the carbon fibers are oriented, crossed and thus mechanically stabilized. As the case may be, the thickness of the consolidated nonwoven fabric can be calibrated to a desired value. In the case of nonwoven fabrics on the basis of non-oxidized PAN fibers, after laying the nonwoven fabric and consolidating, they are oxidized at an elevated temperature and under an oxygen atmosphere and subsequently carbonized/graphitized under an inert gas atmosphere. Nonwoven fabrics on the basis of oxidized PAN fibers are only subjected to carbonizing/graphitizing after laying and consolidating the nonwoven fabric. Carbon fiber nonwoven fabrics, for the production of which, in a first step, the fibers are laid (carded) in a dry state to form a sliver, are a preferred embodiment of the invention.

If a bonded fiber material is used as fiber material a), this is selected in particular from mechanically bonded fiber materials. A chemical bond, especially with carbonizable polymeric binders, can have a detrimental effect on the bending properties of the gas diffusion layer. In particular, the fiber materials used according to an embodiment of the invention do not contain any polymers other than polymers b1) and b2) added as binders.

In a further suitable embodiment, the fibers are wet laid in a first step. In this embodiment, the term carbon fiber nonwoven fabric then also includes, for example, a wet-laid material consisting of short-cut carbon fibers, carbon black, at least one polymer b1), especially PTFE, and at least one polymer b2), especially PEEK. In contrast to carbon fiber papers known from the prior art, the wet laid fiber materials used according to embodiments of the invention have no or only a very small proportion of phenolic resins as binders. Preferably, the mass fraction of phenolic resins is 0 to 10%, preferably 0 to 5%, in particular 0 to 1%, in relation to the mass of the fiber material a). More particularly, the wet-laid fiber materials used according to embodiments of the invention do not contain any phenolic resins as binders. Even more specifically, the wet laid fiber materials used according to embodiments of the invention do not contain any polymers other than polymers b1) and b2) as binders.

In a special embodiment, the flat, electrically conductive fiber material a) comprises at least one carbon fiber nonwoven fabric. They are advantageous, among other things, since they are compression elastic and can be simply manufactured on an industrial scale, for example, in a roll-to-roll process.

According to an embodiment of the invention, the fiber materials a) are finished with at least one fluorine-containing polymer b1), at least one polymer b2) different from polymer b1), and optionally at least one further additive.

Specifically, the fiber material a) comprises at least one fluorine-containing polymer b1), at least one polymer b2) different from b1), selected from polyaryletherketones, polyphenylene sulfides, polysulfones, polyethersulfones, partially aromatic (co)polyamides, polyimides, polyamide imides, polyetherimides and mixtures thereof, optionally at least one conductivity-improving additive b3), optionally at least one further additive b4) selected from polymeric binders b41) different from b1) and b2), surface-active substances b42), further additives and auxiliary agents b43)

applied thereto and/or incorporated therein.

In the following, the mass or total weight of the fiber material a) refers to the unfinished fiber material, i.e., without components b1), b2) and, if present, b3) and b4).

In a special embodiment, the fiber material a) does not contain any added polymeric binders b41). This applies, in particular, to polymeric binders b41) which would carbonize under the manufacturing conditions of the flat electrically conductive material A).

Polymer b1)

Preferably, the fluorine-containing polymer b1) is selected from polytetrafluoroethylenes (PTFE), tetrafluoroethylene-hexafluoropropylene copolymers (FEP), perfluoroalkoxy polymers (PFA), and mixtures thereof. Perfluoroalkoxy polymers are, for example, copolymers of tetrafluoroethylene (TFE) and perfluoroalkoxy vinyl ethers, such as perfluorovinyl propyl ethers. Preferably, the polymer b1) used is a polytetrafluoroethylene.

Preferably, the mass fraction of the fluorine-containing polymer b1) is 0.5 to 40%, preferably 1 to 20%, in particular 1 to 10%, in relation to the mass of the fiber material a). In a special embodiment, the fluorine-containing polymer b1) is PTFE and the mass fraction of the fluorine-containing polymer b1) is 0.5 to 40%, preferably 1 to 20%, in particular 1 to 10%, in relation to the mass of the fiber material a).

Polymer b2)

In a preferred embodiment, polymer b2) is selected from so-called high-performance plastics characterized by properties such as a high glass transition temperature, a high melting temperature, good temperature resistance, good chemical resistance and good mechanical properties. Preferably, the polymers b2) have a permanent operating temperature (continuous service temperature) of at least 150° C.

Preferred polymers b2) are partially aromatic and aromatic polymers. Preferably, the polymers b2) are thermoplastics.

Preferably, polymers b2) are selected from polyaryletherketones (PAEK), polyphenylene sulfides (PPS), polysulfones (PSU), polyethersulfones (PES), partially aromatic (co)polyamides (high-temperature polyamides, HTPA), polyimides (PI), polyamide imides (PAI), polyetherimides (PEI) and mixtures thereof. Suitable polymers b2) are also (partially) aromatic polyesters, such as PET or PBT, polycarbonates (PC) and temperature-resistant melamines, such as melamine foams filled with nanoporous $SiO_2$ aerogels.

In a preferred embodiment, the polymer component b2) comprises at least one polyaryletherketone. Specifically, the polymer component b2) comprises at least one polyaryletherketone. Polyaryletherketones (PAEK) are semicrystalline thermoplastics which have an alternating structure in which each aryl group is followed by a keto group (carbonyl group) or ether group, the proportions of the keto and ether groups being variable and able to differ in the substitution pattern on the aryl rings. Suitable polyaryletherketones b2) are polyetherketones (PEK), polyetheretherketones (PEEK), polyetherketoneketones (PEKK), etc. Preferably, the polymer component b1) comprises at least one polyetherketone or consists of at least one polyetheretherketone.

Suitable partially aromatic (co)polyamides b2) are the polymers known as high-temperature polyamides (HTPA). These are semicrystalline or amorphous, thermoplastic, partially aromatic polyamides. Preferably, these contain at least one aromatic dicarboxylic acid incorporated by polymerization, in particular selected from terephthalic acid, isophthalic acid and mixtures of terephthalic acid and isophthalic acid. Preferred partially aromatic (co)polyamides b2) are selected from PA 6.T, PA 10.T, PA 12.T, PA 6.I, PA 10.I, PA 12.I, PA 6.T/6.I, PA 6.T/6, PA 6.T/10T, PA 10.T/6.T, PA 6.T/12.T, PA12.T/6.T and mixtures thereof. Another specific embodiment of polyamides b2) is polyphthalamide (PPA).

Suitable polyimides b2) are polysuccinimide (PSI), polybismaleinimide (PBMI), polyimidesulfone (PISO) and polymethacrylimide (PMI).

Preferably, the mass fraction of the polymer b2) is 0.5 to 40%, preferably 1 to 20%, in relation to the mass of the fiber material a). In a particular embodiment, the polymer b2) is selected from PEEK, PPS and mixtures thereof and the mass fraction of the polymer b2) is 0.5 to 40%, preferably 1 to 20%, in relation to the mass of the fiber material a).

Further Additives

In most cases, the fiber material a) already has good electrical and thermal conductivity due to the carbon fibers used, even without conductivity-improving additives. To improve the electrical and thermal conductivity, however, the fiber material a) can be additionally finished with at least one conductivity-improving additive b3). Preferably, the conductivity-improving additive b3) is selected from metal particles, carbon black, graphite, graphene, carbon nanotubes (CNTs), carbon nanofibers and mixtures thereof. Preferably, the conductivity enhancing additive b3) comprises carbon black or consists of carbon black. The finishing of the fiber material a) with at least one conductivity-improving additive b3) can, for example, be carried out together with the polymer b1) and/or b2) and/or further additives. Preferably, an aqueous dispersion is used to finish the fiber material a).

Preferably, the mass fraction of the conductivity-improving additive b3) is 0.5 to 45%, preferably 1 to 25%, in relation to the mass of the fiber material a). In a special embodiment, the conductivity-improving additive b3) comprises carbon black or consists of carbon black and the mass fraction is 0.5 to 45%, preferably 1 to 25%, in relation to the mass of the fiber material a).

Preferably, the total weight of components b1), b2) and b3) is 3 to 50% by weight, preferably 5 to 35% by weight, in relation to the total weight of the (unfinished) fiber material a).

Preferably, the fiber material a) contains, applied thereto and/or incorporated therein, 10 to 50% by weight of at least one fluorine-containing polymer b1), 5 to 40% by weight of at least one polymer b2) different from b1) and 20 to 80% by weight of at least one conductivity-improving additive b3), in relation to the total weight of components b1), b2) and b3).

The fiber materials a) may additionally contain at least one further additive b4). These include, for example, polymeric binders b41) different from components b1) and b2), surface-active substances b42), etc. Suitable binders b41) are, for example, furan resins, polyimide resins, etc. The finishing of the fiber material a) with at least one further additive b4) can be carried out together with the polymer b1) and/or b2) and/or further additives. The binders b41) can be subsequently cured, if necessary. This can be carried out, for example, together with the drying and/or sintering following the finishing with the polymers b1) and b2) or separately therefrom.

Preferably, the total mass fraction of further additives b4) is 0 to 80%, preferably 0 to 50%, in relation to the mass of the fiber material a). If the fiber materials a) additionally contain at least one further additive b4), the total mass fraction of further additives b4) is 0.1 to 80%, preferably 0.5 to 50%, in relation to the mass of the fiber material a).

In particular, the fiber material a) contains other polymers b41) different from the fluorine-containing polymers b1) and the polymers b2) in a mass fraction of at most 5%, preferably at most 1%, particularly preferably at most 0.5%, in particular at most 0.1%, in relation to the total weight of the fiber material a), applied thereto and/or incorporated therein. Even more particularly, the fiber material a) does not contain any additions of further polymers b41) which are different from the fluorine-containing polymers b1) and the polymers b2).

The fiber material a) preferably has a thickness in the range from 50 to 500 μm, particularly preferably from 100 to 400 μm. This thickness refers to the non-finished, uncompressed state of the fiber material a), i.e. before the GDL is installed in a fuel cell.

The fiber material a) can be finished with components b1), b2) and, as the case may be, b3) and/or b4) by conventional processes. Suitable coating and impregnation processes are described in more detail below.

In a special embodiment, the fiber material a) equipped with components b1), b2) and, as the case may be, b3) and/or b4) is subjected to thermal treatment (sintering).

A preferred embodiment is a gas diffusion layer comprising a sintered product of A) obtained by thermal treatment at a temperature of at least 250° C., preferably of at least 300° C., in particular in a range from 300 to 450° C., especially from 350 to 450° C.

In a preferred embodiment, the gas diffusion layer comprises a two-layer composite based on a flat, electrically conductive material A) or a sintered product thereof and a microporous layer (MPL) B) on one of the surfaces of the fiber material A).

In contrast to the macro-porous fiber material A), the MPL is microporous, having pore diameters usually substantially below one micrometer, preferably of at most 900 nm, particularly preferably of at most 500 nm, in particular of at most 300 nm. The mean pore diameter of the MPL B) is preferably in the range of 5 to 200 nm, particularly preferably from 10 to 100 nm. The mean pore diameter is determined, again, via mercury porosimetry. The MPL contains conductive carbon particles, preferably carbon black or graphite, in a matrix of a polymeric binder. Preferred binders are the above-mentioned fluorine-containing polymers, especially polytetrafluoroethylene (PTFE).

The microporous layer b) preferably has a thickness in the range of 10 to 100 μm, particularly preferably from 20 to 50 μm. This thickness relates to the uncompressed state of the microporous layer B), i. e., prior to installation of the GDL in a fuel cell.

The gas diffusion layer of an embodiment of the present invention preferably has a thickness (overall thickness of fiber material A) and MPL B)) in the range of 80 to 1000 μm, particularly preferably from 100 to 500 μm. This thickness relates to the uncompressed state of the GDL, i. e., prior to installation in a fuel cell.

Manufacturing Method

In step i) of the method according to an embodiment of the invention, at least one fiber material is provided, selected from carbon fiber nonwoven fabrics, carbon fiber fabrics and mixtures thereof. Regarding suitable and preferred fiber materials, reference is made to the above explanations in full.

In step ii), the fiber material provided in step i) is coated and/or impregnated with an aqueous composition comprising at least one fluorine-containing polymer b1) and at least one polymer different from b2) selected from polyaryletherketones, polyphenylene sulfides, polysulfones, polyethersulfones, partially aromatic (co)polyamides, polyimides, polyamide-imides, polyether-imides and mixtures thereof. Regarding suitable and preferred polymers b1) and b2), reference is made to the above explanations in full.

The finishing of the fiber materials by coating and/or impregnation is carried out according to conventional application processes known to the person skilled in the art. Preferably, a process for coating and/or impregnating the fiber materials is used which is selected from padding, doctoring, spraying, kiss rolling and combinations thereof.

In the padding process, the fiber material is passed through a padder (dip tank) with the additive-containing solution or dispersion and subsequently squeezed off to the desired application quantity of additive by using a pair of pressure-adjustable and, if necessary, gap-adjustable rollers.

In the doctoring process, a distinction is made between gravure printing and screen printing. In gravure printing, for example, a knife-like sharpened steel band with or without a support blade is used as a doctor-blade. It is used to wipe off the excess additive-containing solution or dispersion from the webs of the pressure cylinder (skim off). In screen printing, on the other hand, the doctor-blade is usually made of rubber or plastic with a sharp or rounded-off edge.

In spray application, the additive-containing solution or dispersion is applied to the fiber material to be finished by means of a slot nozzle.

The kiss-roll process is used to coat the underside of the material of horizontal webs. The coating medium can be applied to the web in the opposite direction or in the direction of travel. Indirect coating with small application quantities can be achieved by means of transfer rollers.

In a particular embodiment, the padding process is used to finish the cleaning articles according to embodiments of the invention.

In step iii) of the method according to an embodiment of the invention, the coated and/or impregnated fiber material is subjected to drying and/or sintering. Suitable processes for drying nonwoven fabrics or fabrics coated and/or impregnated with additive-containing solutions or dispersions are generally well known. After application, for example, at least part of the solvent, especially the water, can be extracted from the fiber material by passing it, for example, over an extraction opening from which the liquid is removed by means of an applied vacuum. Alternatively or additionally, the fiber material can be dried at an elevated temperature. Additionally, the drying can be carried out at a reduced pressure. Preferably, the fiber material is dried at a temperature in the range from 20 to 250° C., particularly preferably 40 to 200° C.

In addition, or as an alternative to drying, the coated and/or impregnated fiber material can be subjected to sintering in step iii). Sintering is preferably carried out by thermal treatment at a temperature of at least 250° C., preferably of at least 300° C., in particular in a range from 300 to 450° C., especially from 350 to 450° C.

Subsequently, the finished and dried and/or sintered fiber material can be coated with a microporous layer in step iv). With regard to suitable and preferred embodiments of the microporous layer, reference is made to the above explanations in full.

Fuel Cell

A further subject matter of an embodiment of the present invention is a fuel cell, comprising at least one gas diffusion layer as defined above and obtainable by a method as defined above.

In principle, the gas diffusion layer according to an embodiment of the invention is suitable for all the usual types of fuel cells, in particular low-temperature proton exchange membrane fuel cells (PEMFC). Reference is made in full to the above explanations regarding the structure of fuel cells.

It is an advantage of embodiments of the present invention that the gas diffusion layer can be specifically adapted to the structural conditions of the fuel cell, to the operating media flowing through it and/or to the operating parameters of the fuel cell.

Embodiments of the invention are explained with reference to the following examples, which are to be understood as non-limiting.

EXAMPLES

The flexural properties were determined according to DIN EN ISO 178:2019-08. As described below, flat electrically conductive materials were produced according to an embodiment of the invention and as comparative examples. Some of the materials were additionally provided with a microporous layer (MPL). Test specimens with a test specimen width of 50 mm and a test specimen length of 100 mm were taken from these materials.

The bending load was applied in a 3-point bending flexural test with a support span of 32 mm and a test speed of initially 2 mm/min and later 50 mm/min until rupture occurred or until the specimen slipped off the support points. The bending stiffness [N/mm] and the flexural modulus E [N/mm$^2$] were determined from the measurement of the bending at midspan.

The maximum bending angle was calculated from the maximum bending and half the distance between the two support points:

$$\alpha=\arctan(\text{max. bending/half support span})$$

I) Production of Gas Diffusion Layers

Manufacturing Example 1

A nonwoven fabric made of 100% carbon fibers with a weight per unit area of 63 g/m$^2$ was used to produce a flat electrically conductive material. An impregnating composition was mixed to finish the nonwoven fabric, which contained 60% carbon black, 22% PTFE and 18% PEEK in relation to the solid. The finishing was done by padder impregnation with an aqueous dispersion with 15% finishing weight in relation to the mass of the GDL substrate (corresponding to 9.5 g/m$^2$). This was followed by drying at 160° C. for 5 minutes and sintering at 400° C. for 10 minutes. An MPL was also applied to the stiffened substrate obtained in this way to produce the materials 2) and 3) according to an embodiment of the invention before determining the technical application properties.

Manufacturing Example 2

A nonwoven fabric made of 100% carbon fibers with a weight per unit area of 40 g/m$^2$ was used to produce a flat electrically conductive material. To finish the nonwoven fabric, an impregnating composition was mixed which, in relation to the solid, contained 40% carbon black, 20% PTFE and 40% PPS (Fortron® 0205B4 by Celanese). Finishing was performed by padding impregnation with an aqueous dispersion containing 15% finishing weight in relation to the mass of the GDL substrate (corresponding to 6.0 g/m$^2$). This was followed by drying for 5 minutes at 150° C. and sintering for 10 minutes at 400° C.

II) Measurement of Flexural Properties

The following materials were used to determine the application properties:

1) GDL according to an embodiment of the invention from manufacturing example 1 without MPL.

2) GDL according to an embodiment of the invention analogous to manufacturing example 1 with MPL, For the MPL coating, an MPL paste containing 2 wt % FEP (tetrafluoroethylene-hexafluoropropylene copolymer) and 7.8 wt % carbon in distilled water was applied to the fiber material. The fiber material was then dried at 160° C. and sintered at 400° C. The resulting MPL loading was 21 g/m$^2$.

3) GDL according to an embodiment of the invention from manufacturing example 1 with MPL, For the MPL coating, an MPL paste containing 2.7 wt % PTFE and 10.8 wt % carbon in distilled water was applied to the fiber material. The fiber material was then dried at 160° C. and sintered at 400° C. The resulting MPL loading was 15 g/m$^2$.

V4) Comparative example: nonwoven fabric made of 100% carbon fibers with a weight per unit area of 63 g/m$^2$ according to manufacturing example 1 without impregnation.

V5) Comparative example: nonwoven fabric made of 100% carbon fibers with a weight per unit area of 63 g/m$^2$ according to manufacturing example 1 with PTFE/carbon black impregnation without polymer stiffener V6) Comparative example: Carbon fiber paper GDL with MPL coating Total thickness 120 μm, weight per unit area 103 g/m$^2$ CeTech GDL 120 (CeTech Co. Ltd., Taiwan)

V7) Comparative example: Carbon fiber paper GDL without PTFE impregnation and without MPL coating, not a reelable product but flat sheet product, total thickness 120 μm, Toray TGP-H030 (Toray Industries Inc., Japan)

V8) Comparative example: carbon fiber paper GDL with MPL coating and with PTFE impregnation, not a reelable product but flat sheet product.

Total thickness 220 μm, weight per unit area of 91 g/m$^2$.

SGL 29BC (SGL Carbon SE, Germany)

V9) Comparative example: Carbon fiber paper GDL with MPL coating and with PTFE impregnation, not a reelable product but flat sheet product Total thickness 215 μm, weight per unit area: 74 g/m$^2$ SGL 22BB (SGL Carbon SE, Germany)

V10) Comparative example: Carbon fiber paper GDL with MPL coating and with PTFE impregnation, not a reelable product but flat sheet product Total thickness 190 μm, weight per unit area: 56 g/m$^2$ AVCarb MB030 (AvCarb Material Solutions, USA)

Figure 2:
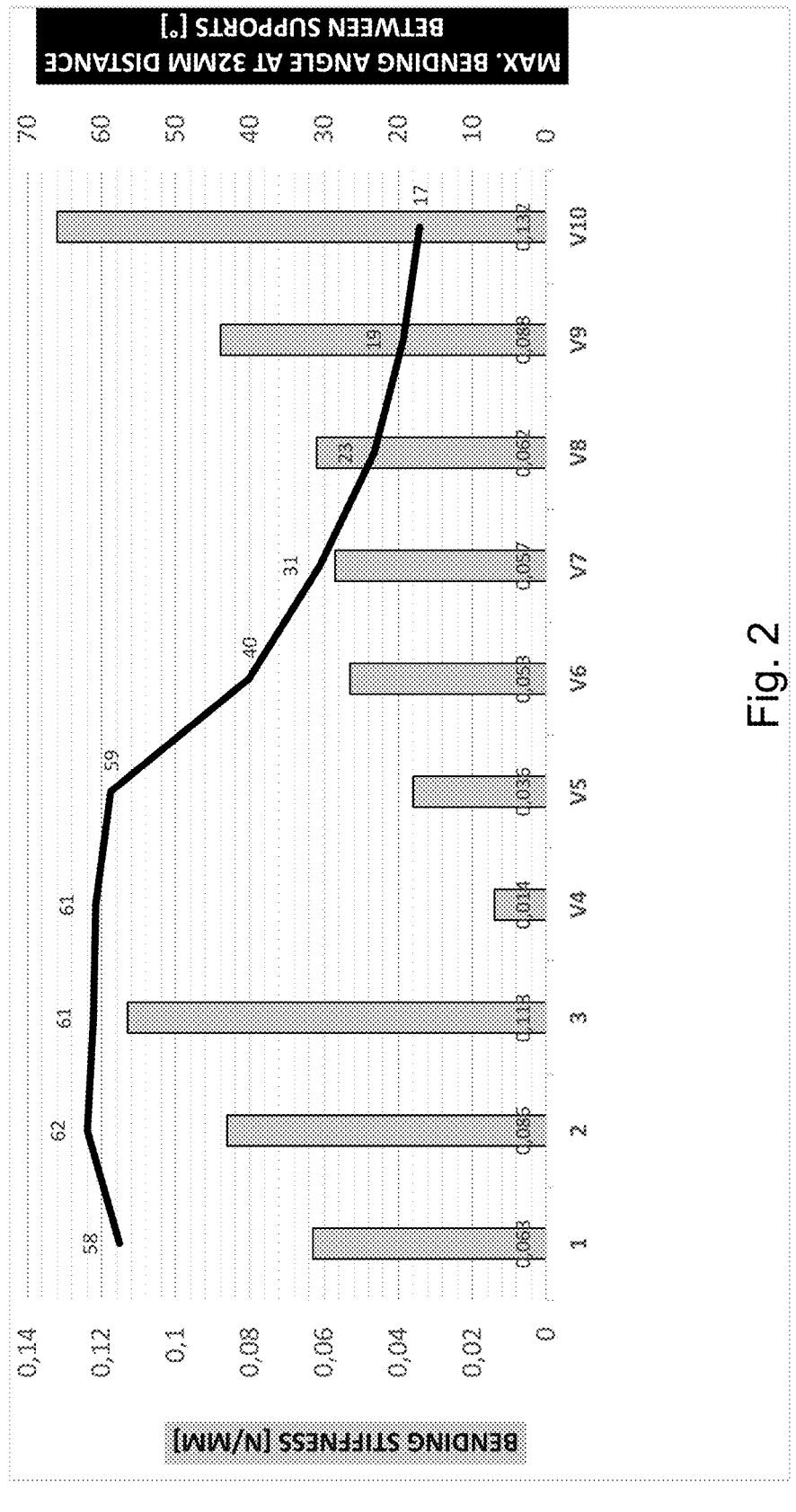
FIG. 2 shows the bending stiffness and maximum bending angles for each of the three GDLs according to an embodiment of the invention and for each of 7 comparative GDLs.
Figure 3:
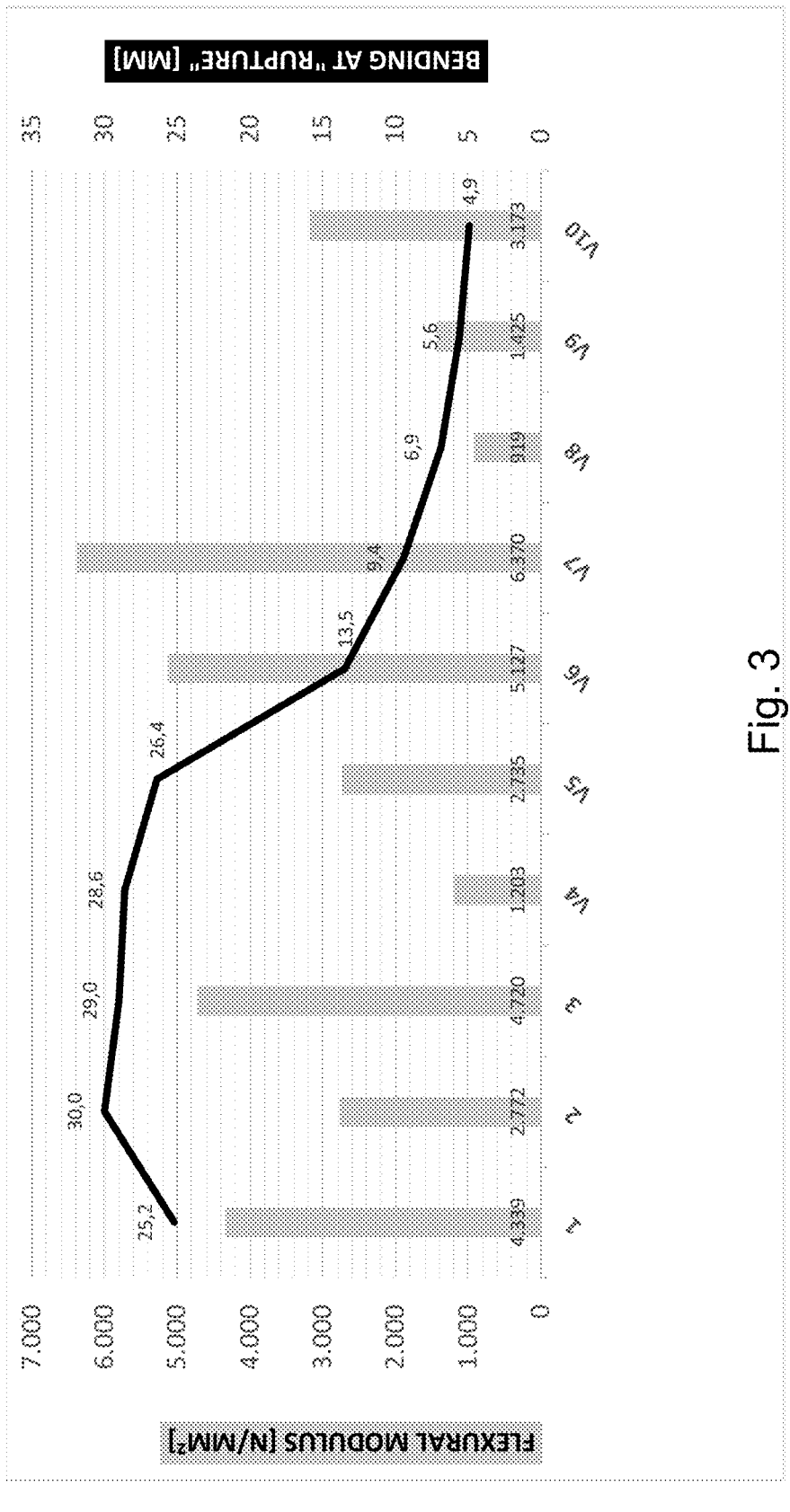
FIG. 3 shows the flexural modulus and the maximum bending up to the occurrence of rupture or until the specimens slide off the support points for each of three GDLs according to an embodiment of the invention and for each of 7 comparative GDLs.
Figure 4:
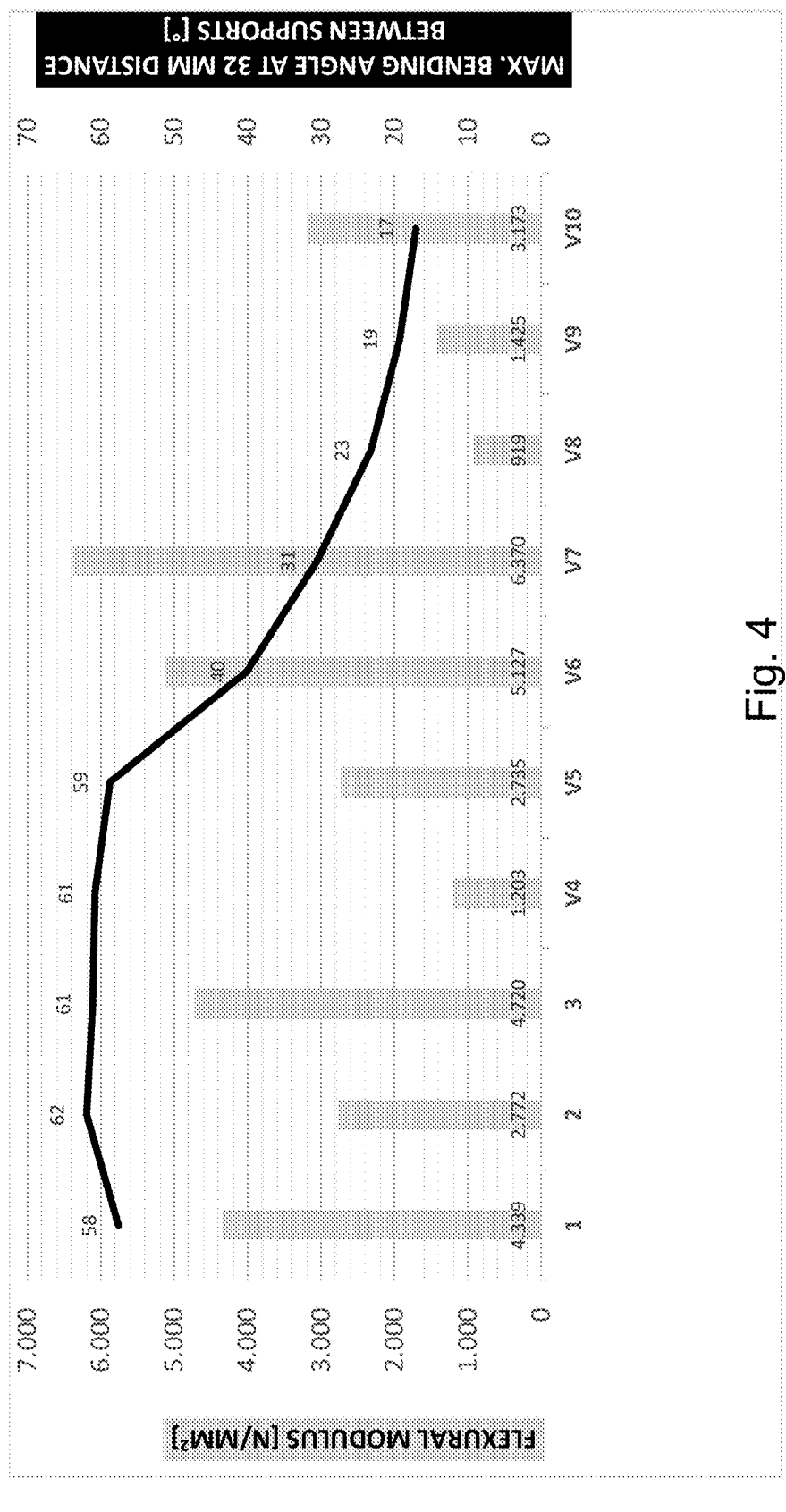
FIG. 4 shows the flexural modulus and the maximum bending up to the occurrence of rupture or until the specimens slide off the support points for each of three GDLs according to an embodiment of the invention and for each of 7 comparative GDLs.

The results of the technical application measurements are shown in FIGS. 1 to 4. It is shown that the gas diffusion layers finished according to embodiments of the invention have an optimum combination of properties of high bending stiffness and high flexibility. Consequently, the maximum bending in the GDLs according to embodiments of the invention is not due the materials rupturing but to the ends slipping off the support points. They exhibit at least comparable and often higher flexural stiffnesses and flexural moduli than carbon fiber papers known from the prior art. Nonwoven fabrics without any finishing or GDL without additional polymer stiffening, as shown by the example of polyetherketones and polyphenylene sulfides, exhibit low bending stiffnesses. In particular, the absence of "brittle rupture behavior" and the significantly larger maximum bending angle provide a particularly advantageous combination of properties.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A gas diffusion layer for a fuel cell, comprising:
   A) a flat electrically conductive material, including:
      a) at least one fiber material selected from the group consisting of carbon fiber nonwoven fabrics, carbon fiber woven fabrics, and a combination thereof, wherein the at least one fiber material includes:
      b1) at least one fluorine-containing polymer, and
      b2) at least one polymer different from b1), selected from the group consisting of polyaryletherketones, polyphenylene sulfides, polysulfones, polyethersulfones, partially aromatic (co) polyamides, polyimides, polyamide-imides, polyether-imides and combinations thereof,
      wherein b1) and b2) are applied to the at least one fiber material and/or incorporated therein;
   and/or:
   B) a sintered product of the flat electrically conductive material.

2. The gas diffusion layer according to claim 1, wherein the flat electrically conductive material is obtainable by coating and/or impregnating the at least one fiber material with an aqueous composition containing the at least one fluorine-containing polymer, and the at least one polymer, and subsequent drying and/or sintering of the at least one fiber material.

3. The gas diffusion layer according to claim 1, wherein the at least one fiber material includes:
   b3) at least one conductivity-improving additive, and/or
   b4) at least one further additive which is selected from the group consisting of:
      b41) polymeric binders different from b1) and b2),
      b42) surface-active substances, and
      b43) further additives and auxiliary agents
   wherein b3) and/or b4) are applied to the at least one fiber material and/or incorporated therein.

4. The gas diffusion layer according to claim 1, wherein the at least one fluorine-containing polymer is selected from the group consisting of polytetrafluoroethylene, tetrafluoroethylene-hexafluoropropylene copolymers, perfluoroalkoxy polymers and combinations thereof.

5. The gas diffusion layer according to claim 1, wherein the at least one polymer is selected from the group consisting of polyaryletherketones, polyphenylene sulfides, polysulfones, polyethersulfones and combinations thereof.

6. The gas diffusion layer according to claim 1, wherein the at least one fiber material additionally includes
   b3) at least one conductivity-improving additive selected from the group consisting of metal particles, carbon black, graphite, graphene, carbon nanotubes (CNTs), carbon nanofibers, and combinations thereof,
   wherein the at least one conductivity-improving additive is applied to the at least one fiber material and/or incorporated therein.

7. The gas diffusion layer according to claim 6, wherein the at least one fiber material includes, in relation to an overall weight of the at least one fiber material:

10 to 50% by weight of the at least one fluorine-containing polymer, 5 to 40% by weight of the at least one polymer, and 20 to 80% by weight of the at least one conductivity-improving additive, wherein each of the at least one fluorine-containing polymer, the at least one polymer, and the at least one conductivity-improving additive are applied to the at least one fiber material and/or incorporated therein.

8. The gas diffusion layer according to claim 6, wherein a total weight of the at least one fluorine-containing polymer, the at least one polymer, and the at least one conductivity-improving additive is 3 to 50% by weight, in relation to a total weight of the at least one fiber material.

9. The gas diffusion layer according to claim 6, wherein the at least one fiber material contains other polymers different from the at least one fluorine-containing polymer b1) and the at least one polymer b2) in a mass fraction of at most 5% in relation to a total weight of the at least one fiber material, the other polymers being applied to the at least one fiber material and/or incorporated therein.

10. The gas diffusion layer according to claim 1, wherein the at least one fiber material contains other polymers different from the at least one fluorine-containing polymer b1) and the at least one polymer b2) in a mass fraction of at most 5% in relation to a total weight of the at least one fiber material, the other polymers the at least one polymers-being applied to the at least one fiber material and/or incorporated therein.

11. The gas diffusion layer according to claim 1, comprising a sintered product of the flat electrically conductive material obtained by thermal treatment at a temperature of at least 250° C.

12. The gas diffusion layer according to claim 1, comprising a sintered product of the flat electrically conductive material obtained by thermal treatment at a temperature in a range from 300 to 450° C.

13. The gas diffusion layer according to claim 1, comprising a microporous layer on a surface of the flat electrically conductive material.

14. The gas diffusion layer according to claim 1, wherein the at least one polymer b2) is one of a polyaryletherketone, a partially aromatic (co) polyamide, a polyimide, a polyamide-imide, a polyether-imide, and/or a combination thereof.

15. The gas diffusion layer according to claim 1, wherein the at least one polymer b2) comprises a polyetheretherketone.

16. A method for producing a gas diffusion layer for a fuel cell, comprising a flat electrically conductive material, the method comprising:

i) providing at least one fiber material selected from the group consisting of carbon fiber nonwoven fabrics, carbon fiber woven fabrics, and combinations thereof;

ii) coating and/or impregnating the at least one fiber material provided in step i) with a composition comprising at least one fluorine-containing polymer and at least one polymer different from the at least one fluorine-containing polymer and selected from the group consisting of polyetherketones, polyphenylene sulfides, polysulfones, polyethersulfones, partially aromatic (co) polyamides, polyimides, polyamide-imides, polyether-imides and combinations thereof; and iii) subjecting the coated and/or impregnated at least one fiber material to a thermal treatment.

17. The method according to claim 16, further comprising:

iv) coating the thermally treated fiber material with a microporous layer.

18. A fuel cell comprising at least one gas diffusion layer as claimed in claim 1.

19. The fuel cell according to claim 18, wherein the flat electrically conductive material or the sintered product of the flat electrically conductive material has at least one of the following properties:

a bending stiffness, determined by loading at midspan in a 3-point bending flexural test according to DIN EN ISO 178:2019-08 on a 50 mm wide, 0.13 mm thick and 100 mm long rectangular test specimen at a support span of 32 mm and a test speed of 2 mm/min, from 0.05 to 0.08 N/mm, a maximum bending angle $\alpha$, determined by loading at midspan in a 3-point bending flexural test according to DIN EN ISO 178:2019-08 on a 50 mm wide, 0.13 mm thick and 100 mm long rectangular test specimen at a support span of 32 mm and a test speed of 2 mm/min, from 50 to 60°, a flexural modulus, determined by loading at midspan in a 3-point bending flexural test according to DIN EN ISO 178:2019-08 on a 50 mm wide, 0.13 mm thick and 100 mm long rectangular test specimen at a support span of 32 mm and a test speed of 2 mm/min, from 3000 to 6000 N/mm².

20. A fuel cell having at least one gas diffusion layer, comprising:

A) a flat electrically conductive material, including:

a) at least one fiber material selected from the group consisting of carbon fiber nonwoven fabrics, carbon fiber woven fabrics, and a combination thereof, wherein the at least one fiber material includes:

b1) at least one fluorine-containing polymer, and b2) at least one polymer different from b1), selected from the group consisting of polyaryletherketones, polyphenylene sulfides, polysulfones, polyethersulfones, partially aromatic (co) polyamides, polyimides, polyamide-imides, polyether-imides and combinations thereof, wherein b1) and b2) are applied to the at least one fiber material and/or incorporated therein;

and/or:

B) a sintered product of the flat electrically conductive material, wherein the flat electrically conductive material or the sintered product of the flat electrically conductive material has at least one of the following properties:

a bending stiffness, determined by loading at midspan in a 3-point bending flexural test according to DIN EN ISO 178:2019-08 on a 50 mm wide, 0.13 mm thick and 100 mm long rectangular test specimen at a support span of 32 mm and a test speed of 2 mm/min, from 0.05 to 0.08 N/mm, a maximum bending angle $\alpha$, determined by loading at midspan in a 3-point bending flexural test according to DIN EN ISO 178:2019-08 on a 50 mm wide, 0.13 mm thick and 100 mm long rectangular test specimen at a support span of 32 mm and a test speed of 2 mm/min, from 50 to 60°, and/or a flexural modulus, determined by loading at midspan in a 3-point bending flexural test according to DIN EN ISO 178:2019-08 on a 50 mm wide, 0.13 mm thick and 100 mm long rectangular test specimen at a support span of 32 mm and a test speed of 2 mm/min, from 3000 to 6000 N/mm$^2$.

\* \* \* \* \*